United States Patent [19]
Alford

[11] 3,972,044
[45] July 27, 1976

[54] ANTENNA SYSTEM FOR DOPPLER VOR GROUND STATIONS

[76] Inventor: Andrew Alford, 120 Cross St., Winchester, Mass. 01890

[22] Filed: Apr. 8, 1974

[21] Appl. No.: 459,068

[52] U.S. Cl. .............................. 343/106 D; 343/848
[51] Int. Cl.² ......................................... G01S 1/38
[58] Field of Search ............... 343/848, 713, 106 D, 343/113 DE, 705, 709, 711, 846, 854, 876

[56] References Cited
UNITED STATES PATENTS

| | | | |
|---|---|---|---|
| 2,436,408 | 2/1948 | Tawney | 343/849 |
| 2,941,204 | 6/1960 | Bailey | 343/713 |
| 3,273,152 | 9/1966 | Earp | 343/106 D |
| 3,482,248 | 7/1967 | Jongs, Jr. | 343/727 |

*Primary Examiner*—Maynard R. Wilbur
*Assistant Examiner*—Richard E. Berger

[57] ABSTRACT

A method used to correct counterpoise distortion of horizontal patterns of antennas radiating horizontally polarized high frequency radiation is described and is applied to reduce undesirable amplitude modulation of the scanned carrier causing bearing errors in a doppler VOR System with amplitude modulated reference used in air navigation.

6 Claims, 14 Drawing Figures

ANTENNA SYSTEM FOR DOPPLER VOR GROUND STATIONS

This invention is related to the Doppler VOR Air Navigation Systems. In particular, the present invention deals with ground portions of the Doppler VOR Systems operating in the carrier frequency range 112 to 118 MHz. One of the objects of this invention is to reduce the bearing errors of the ground stations as received by what is now a standard VOR receiver in which the bearing information is obtained by comparing the phase of an FM modulated 30 Hz signal transmitted on one carrier (Carrier A) with the phase of a 30 Hz signal transmitted on the second carrier (Carrier B) located within approximately 9.96 KHz from the first carrier.

Doppler VOR ground stations presently in use comprise a large circular horizontal screen elevated approximately a wave length above ground and with a number of loop antennas as described in FIG. 4 of U.S. Pat. No. 2,283,897, arranged in a circular array above the circular screen, usually referred to as the counterpoise. The array consists of 52 loop antennas arranged around a circle 46 feet in diameter, the center of which is at the center of the circular counterpoise. At the center of the array is located another loop antenna. This center loop is used to transmit AM modulated reference at 30 Hz on Carrier B. Carrier A is fed through a distributor which, in its simplest form comprises a metal arm that is rotated about an axis perpendicular to the metal arm. The rotating arm consecutively makes capacitive connection with the inner conductors of the cables supplying the 52 loop antennas arranged around the 46 foot circle. The outer conductors of the coaxial lines feeding the 52 loops are connected to the round pill box enclosing the rotating metal arm. The axis about which the arm is rotated is the axis of symmetry of the pill box. The inner conductor of this cable enters through insulating means into the pill box and there is capacitively coupled to the rotating arm of the distributor. As the metal arm is rotated at 30 Hz, the VOR receiver in an aircraft receives a signal that appears to come from a loop rotating at 30 Hz around a circle 46 feet in diameter. Because of the Doppler effect, the received frequency of Carrier A is sinusoidally displaced upward and downward in frequency and may be regarded as frequency modulated signal. Because the rotating arm in the distributor makes capacitive connection consecutively with one element, and then with somewhat less coupling, with two elements, and then again with one element, and so on, there is superimposed on the 30 Hz frequency other AM modulated signals having periods 52 times 30, 104 times 30, etc.

The signal arriving at the aircraft receiver is first amplified in an rf amplifier, then further amplified in the intermediate stages, and finally detected by a linear AM detector. Assuming an ideal ground station, the product of the detector would comprise the following signals: The RF Hz reference signal received as the result of the AM modulation of the B Carrier. The 30 Hz phase of this signal would be independent of the aircraft position. Other products of detection are the FM modulated 9.96 KHz signal, and a large number of higher frequency signals, plus their cross modulation products.

The signal received from an actual station contains other sources of 30 Hz signal, the phases of which are dependent on the bearing of the receiver, and, therefore, are sources of bearing errors. My tests show that only the loop antenna placed at the center of the circular counterpoise results in a circular pattern. When a loop is displaced from the center of a circular counterpoise, the signal transmitted over the center of the counterpoise at low angles above the horizon is smaller than the signal transmitted in directions away from the center. In general, it was observed that the greater the distance which a signal travels over an elevated horizontal screen, the more the signal is decreased, particularly at lower angles above the horizon. One consequence of this phenomenon is that when the distributor rotating arm makes each complete revolution, the amplitude of the Carrier A signal at the receiver is modulated in amplitude one cycle. The maximum signal is observed when the rotating arm excites the nearest loop. The minimum occurs when the arm excites the farthest loop from the receiver. When the distributor arm rotates at 30 revolutions per second/30 Hz, AM modulation of Carrier A is observed. The 30 Hz modulation of the A Carrier is demodulated in the AM detector and is added to the 30 Hz modulation received as a result of the AM modulation of Carrier B transmitted from the centrally located antenna on the circular screen.

While the phase of the 30 Hz modulation from reference Carrier B does not vary as the bearing of the aircraft is varied, the phase of the 30 Hz AM modulation on Carrier A is a linear function of bearing angle $\theta$. That is, the 30 Hz wave may be expressed by COS $\{WT - (\theta - \theta_o)\}$ Where $W = 2T \times 30$, $\theta$ = the bearing angle, $\theta_o$ is the bearing angle at which the 30 Hz modulations on Carrier A is in the same phase with the 30 Hz modulation with Carrier B, which may be represented by A.COS WT. The two 30 Hz signals are added in the receiver. The phase $\phi$ of resultant which then serves as the reference does not remain constant, but varies non-linearly with the bearing angle as will be explained in detail in this specification.

The fact that the phase angle varies with the bearing angle results in bearing errors. Bearing errors of this origin are, however, not the only bearing errors that may be observed.

In the presence of a large reflecting object such as, for example, a hangar in the field of the doppler VOR ground station, there is likely to be a sector within which there is present a relatively large reflected signal. Carrier A signal reflected from the hangar results in a 30 Hz modulation, the phase of which corresponds to the bearing of the hangar. Because of the interference between the signals arriving via direct path and via the reflection from the hangar, the observed bearing may fluctuate at a rate which depends on the direction in which the aircraft is traveling, on its speed, and on the distances between the DVOR, the hangar, and the distance from the aircraft to the DVOR and the hangar.

According to my invention, I replace the now conventional omnidirectional loop antennas arranged in a circle (which is usually approximately 46 feet in diameter) by directional antennas, radiating limacon type of patterns with maxima being directed toward the center of the circular screen (the center of the counterpoise) the maximum to minimum ratio of the directional patterns being chosen to compensate for the effect of the counterpoise so that the directional antennas, acting together with the counterpoise, result in at least a roughly elliptical radiation pattern, if not a circular one. Elliptical radiation patterns have two maxima and two minima. Since the rotation of this type of pattern at 30 revolutions per second results in 60 Hz rather than 30 Hz modulation, the bearing error is substantially reduced because the presence of some 60 Hz modulation at the detector need not and normally does not interfere with the measurement of the relative phase between two 30 Hz waves in the aircraft receiver.

I find that even a simple cylindrical antenna about 15 inches in diameter with one longitudinal slot which radiates a somewhat skull-like pattern with a front to back ratio of about 1.4 (3dB) is substantially better than almost perfectly omnidirectional loop antennas for use along the circle in a doppler VOR ground station.

The 3 dB preemphasis of radiation toward the center of the screen is not sufficient to fully counteract the effect of the counterpoise. My tests show that approximately 8 dB preemphasis is required. As will be explained in the specification, this may be obtained by using a cylindrical antenna with two longitudinal vertical slots located 180° along the cylinder from each other. A substantial degree of compensation of the counterpoise effect can also be achieved by using a cylinder with four longitudinal slots, such as is shown in FIGS. 8, 9, and 10 in U.S. Pat. No. 2,765,461. The slots, for example, may be fed through hybrids.

As shown in FIG. 9 of said patent, only the sum inputs of the hybrids and one difference input would be used and means for properly dividing the relative power and relative phase between these inputs be provided as will be explained in connection with the figures.

One object of my invention is to provide a means for reducing the effect of counterpoise modulation in doppler VOR's and thereby to decrease bearing errors of such VOR's.

Another object of my invention is to improve the accuracy of doppler VOR stations in the presence of large reflecting objects.

Still another object of the invention is provide a means for compensating for the distortion of the horizontal patterns of an antenna mounted off center on a horizontal sheet.

Other objects, features and advantages of the present invention will be apparent from the following description of an embodiment of the invention which represents the best known use of the invention. This embodiment is shown in the accompanying drawings in which.

Figure 4:
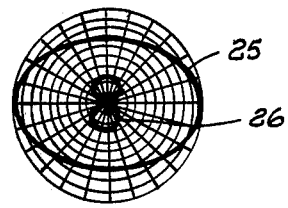

FIG. 4. Oval shaped pattern produced by feeding two slots in cylindrical antenna of FIG. 4.

Figure 5:
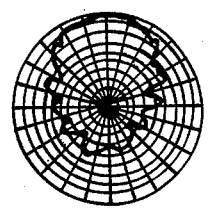

FIG. 5 shows the sum and the difference radiation patterns of the cylindrical antenna with two slots made in accordance with the present invention.

Figure 3:
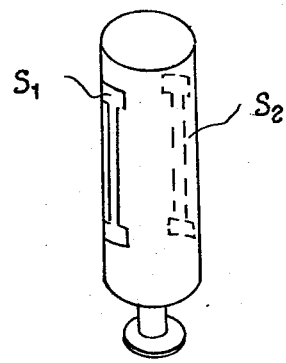
FIG. 3 shows one of the individual antennas which may be used in the antenna array of FIG. 1.
Figure 6:
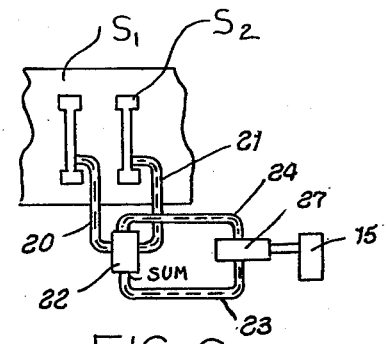

FIG. 6 shows a method for feeding the double slot cylindrical antenna of FIG. 3.

Figure 7:
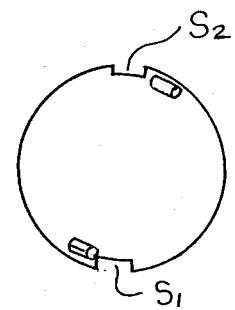

FIG. 7 shows some details of the feeding connections.

Figure 8:
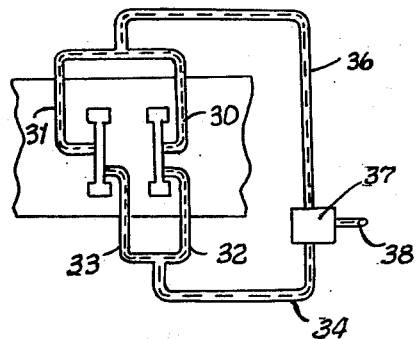

FIG. 8 shows an alternate method for feeding a double slot antenna of FIG. 3.

Figure 9:
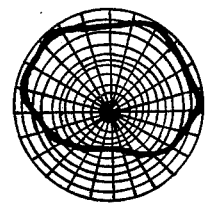

FIG. 9 shows the radiation pattern of a double slot antenna in space, that is, for example, fed as in FIG. 6.

Figure 10:
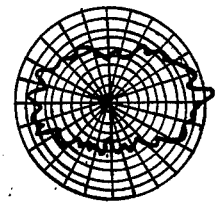

FIG. 10 shows the horizontal radiation pattern obtained when the double slot antenna having space pattern as in FIG. 9 is mounted non-centrally on the counterpoise with minimum of radiation from the antenna directed away from the center of the counterpoise.

Figure 11:
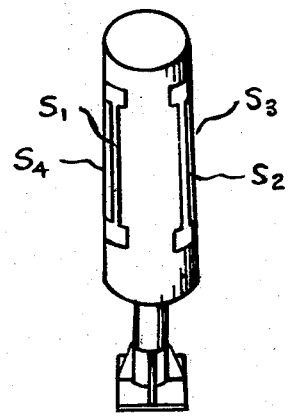

FIG. 11 shows an antenna with four longitudinal slots.

Figure 12:
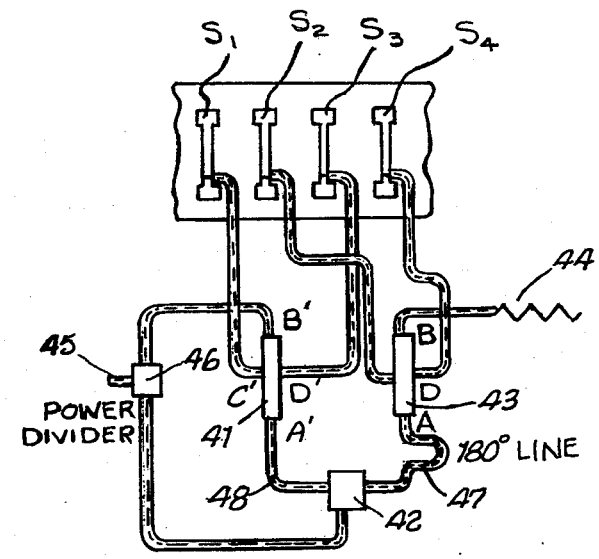

FIG. 12 shows a method for feeding an antenna of FIG. 11 with four slots.

Figure 13:
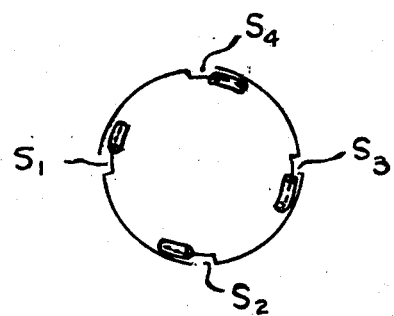

FIG. 13 shows certain details of the feeding system.

Figure 14:
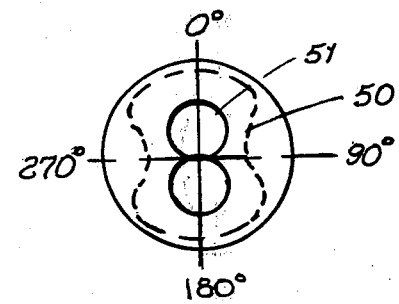

FIG. 14 shows component radiation patterns of the four slot antenna as fed for use in accordance with the present invention.

DESCRIPTION OF THE EMBODIMENTS OF THE INVENTION

Figure 1:
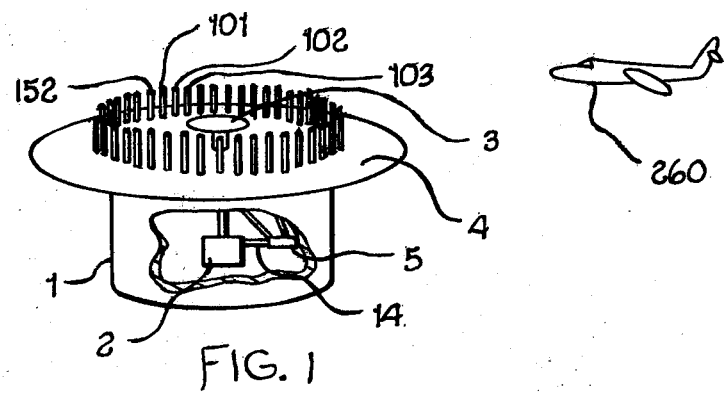
FIG. 1 is a schematic drawing showing a doppler VOR system in accordance with one embodiment of the present invention.

FIG. 1 shows a schematic view of the doppler VOR system in accordance with one embodiment of the present invention. In this figure, 1 is a small building enclosing the transmitter 2 which supplies Carrier B, amplitude modulated at 30 Hz. This AM modulated carrier is fed to the central omnidirectional antenna 3 that is mounted at the center of a large circular horizontal screen 4. Transmitter 2 also supplies another carrier, Carrier A, in its unmodulated state, to distributor 5 which alternately feeds antennas 101, 102, 103, . . ., 152 arranged around a circle of diameter D with its center located at the center of the circular screen. In accordance with the present invention 101, 102, . . . 152 are directional antennas, each antenna radiating a greater portion of its total radiation in the general direction toward the center Antenna 3.

Figure 2:
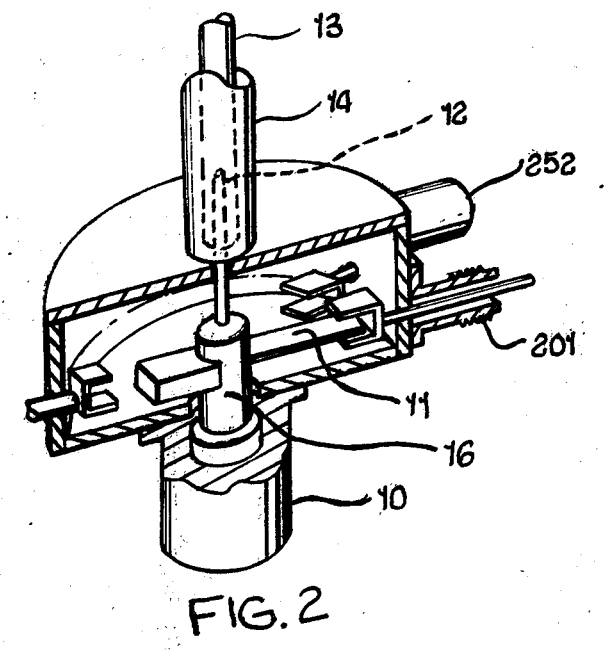
FIG. 2 shows a distributor which may be used in the system of FIG. 1.

The details of the distributor 5 are shown in FIG. 2. In this figure a motor 10 is coupled through an insulating shaft 16 to a metal rotating arm 11. Arm 11 is energized through a capacitive rotary joint 12 which is connected to the inner conductor 13 of coaxial line 14 which is connected to transmitter 2. Carrier A from transmitter 2 is supplied through coaxial line 14 to distributor 5. The rotating arm 11 is alternately capacitively coupled to the inner conductors of coaxial lines 201, 202, . . . 252, which energize antennas 101, 102, . . . 152. The outer conductors of these coaxial lines, as well as the outer conductor of coaxial line 14, are all connected to the outer surfaces of the round pill box-like metal enclosure 15.

Arm 11 is rotated by motor 10 at 30 revolutions per second (1800 rpm). A distant aircraft 260 receives carrier B which is amplitude modulated at 30 Hz. It also receives Carrier A which becomes modulated as a result of the consecutive excitation of antennas 101, 102, 103, etc., the full circle of which is completed in 1/30 of a second. The effect of this consecutive excitation of antennas arranged in a circle is approximately the same in its major respects as rotation of one antenna round this same circle. As the antenna approaches the aircraft, an increase in carrier frequency is observed by the aircraft receiver because of the doppler effect. As the antenna recedes from the aircraft, downward shift in frequency is observed. When an antenna travels along the circumference of a circle 46 ft in diameter at 30 revolutions per second, the doppler shift in frequency comes out to be approximately from −500 to +500 Hz which is the desired amount of deviation, consistent with the standard VOR receivers. Because an antenna is not continuously rotated around a circle, but, instead, a large number of antennas arranged around the circumference are consecutively switched, some transient phenomena are observed in addition to the doppler frequency modulation. Since the transient phenomena result in modulation frequencies which are rejected by the receiver, only the major features, that is, the doppler effect is observed.

In order to avoid deep minima in the radiation patterns in vertical planes, it has been customary to mount doppler VOR antennas above a circular screen such as 4 in FIG. 1. Such a circular screen has no effect on the horizontal pattern of the centrally located antenna such as antenna 3, but it does have a decided effect on the horizontal pattern of an antenna radiating horizontally polarized waves and located closer to one edge of a large horizontal screen. It is found that horizontally polarized signal radiated at low angles above the horizon, such as to 2°, 5°, or 10° above the horizon, is reduced in the direction in which the counterpoise extends farther out away from the antenna.

For example, the signal received at distant aircraft 260 in FIG. 1 from a loop antenna would be greater when received from the antenna closest to the aircraft. This would be due to the effect of the counterpoise 4 and not to the negligible difference in the distances. This counterpoise effect is sufficiently large to produce substantial errors. For example, in FIG. 5 is shown a polar, approximately linear, plot of the measured signal vs. bearing angle obtained with a nearly omnidirectional antenna placed in a location such as 101 on the counterpoise. These measurements were made with the aid of a scaled model used at a correspondingly scaled frequency. The scale factor was 22.5.

As the distributor arm 11 in FIG. 2 rotates, still assuming omnidirectional loop antennas around the circle in FIG. 1, the radiation pattern of FIG. 5 would rotate at 30 revolutions and would produce a 30 Hz amplitude modulation of Carrier A in the receiver at the distant aircraft 260. This is believed to be what actually happens to the signal sent by the present doppler VOR stations.

The phase of this 30 Hz AM modulation of Carrier A varies with the bearing angle ($\theta - \theta_o$) of the aircraft 260. This 30 Hz signal, arriving on Carrier A, may be represented as $b \cos \{WT - (\theta - \theta_o)\}$. This signal is added to the normal reference signal, $a \cos WT$. The total signal is $T = a \cos WT + b \cos \{WT - (\theta - \theta_o)\}$.
The total signal $$T = \sqrt{a^2 + b^2} \cos (WT + \phi)$$

$$\tan \phi = \frac{b/a \sin (\theta - \theta_o)}{1 + b/a \cos (\theta - \theta_o)}$$

Where $a$ and $b$ are the amplitudes of the two demodulated 30 Hz signals and ($\theta - \theta_o$) is bearing of the aircraft. When the resultant reference phase $\phi$ is plotted as a function of the bearing ($\theta - \theta_o$) for a given value of the ratio of the two amplitudes, it is found that it varies non-linearly with the bearing. This results in bearing errors. As previously explained in this specification, further errors result from this same phenomenon of AM counterpoise modulation of Carrier A when a large reflecting object is illuminated by the doppler VOR antenna system.

According to the present invention, in order to overcome the bearing error caused by the amplitude modulation at 30 Hz of Carrier A, the antennas such as 101, 102, ... 152 in FIG. 1 may be made of the type shown in FIG. 3. The antenna of FIG. 3 consists of a metal cylinder approximately 0.15 wavelengths in diameter and 0.7 to 1.0 wavelengths high. Resonant, diametrically opposite, longitudinal slots $S_1$ and $S_2$ are fed as shown in FIGS. 6 and 7 or alternatively as in FIGS. 8 and 7. FIG. 6 shows an unfurled inside view of the feeder arrangement. In this figure 20, 21 are coaxial feeders of equal length; 22 is a hybrid. Line 23 feeds the sum end of the hybrid 22. Power fed to the sum end of hybrid 22 produces the oval shaped pattern 25 in FIG. 4. The power fed over line 24 in FIG. 6 to the difference end of the hybrid 22 produces a figure of eight radiation pattern such as shown by curve 26 in FIG. 4. By using a power divider 27 and by adjusting the relative lengths of lines 24, 23 one can obtain the radiation pattern of FIG. 9. Having adjusted the feeder system of FIG. 6, I obtained the overall pattern shown in FIG. 10 by orienting the antenna of FIG. 3 so that the minimum of radiation shown downward in FIG. 9 was directed away from the center of the counterpoise in FIG. 1. The pattern shown in FIG. 10 was obtained with the antenna mounted on the counterpoise. When a pattern of FIG. 10 is rotated, very small amounts of 30 Hz modulation is obtained. The major portion of the amplitude modulation is then 60 Hz modulation which would be rejected by the aircraft receiver. Thus, by using a directional antenna such as a simple cylinder with two longitudinal slots, it is possible substantially to reduce the 30 Hz amplitude modulation of Carrier A, and therefore, also the consequent bearing errors.

In FIG. 8 is shown an alternate method of feeding a double slot antenna. In this figure, each of the feeders 30, 31, 32, 33 is made roughly a quarter of a wavelength long. The lengths of cables 30 and 31, however, should be made accurately equal. The same is true of cables 33 and 32. When this is done, the circuit acts something like a hybrid in that the power fed into line 34 from power divider 37 does not go into line 36 and vice versa. This makes it possible to divide the power in the desired proportions and the desired relative phases so as to obtain the desired degree of directivity, that is, the front to back ratio in the radiation pattern which would just overcome the measured ratio of the counterpoise distortion. The front to back ratio which I found to give the desired result shown in FIG. 10 was approximately 7 dB. The value of the desired front to back ratio, however, depends on the following factors: (1) the ratio of the distances along the counterpoise from the antenna to the nearest edge to the distance to the farthest edge. In my case, this ratio was 0.175; (2) The height of the center of radiation above the counterpoise in wavelengths. In my measurements, it was approximately 0.5 $\lambda$. The diameter of the circle on which antennas were mounted was approximately 5.4 wavelengths. The overall diameter of the counterpoise was approximately 7.7 wavelengths.

By using a four slot cylindrical antenna such as is shown in FIG. 11, it is possible to substantially reduce not only 30 Hz, but also the 60 Hz modulation. For this purpose, the feeding system may be similar to the system described in connection with FIG. 6. The four slot system is shown in FIGS. 12 and 13. In these figures, hybrid 41 feeds slots $S_1$ and $S_3$ located on opposite sides of the cylinder. The pattern obtained with these two slots may be made similar to that shown in FIG. 9. The power fed to the sum port A' of hybrid 41 come from power divider 42 which also supplies power to the sum port A of hybrid 43 which feeds slots $S_2$ and $S_4$. The combined action of all four slots fed through the sum ports of hybrids 41 43, together with the 180° difference in lines 47, 48 results in a radiation pattern similar to pattern 50 in FIG. 14. The power delivered to port B' of hybrid 41 results in a figure of eight patterns such as 51 in FIG. 14.

When patterns 51 and 50 are added by the circuit of FIG. 12, the resulting pattern is similar, but narrower than that shown in FIG. 9. When such a four slot antenna is used on a counterpoise nearly circular pattern with a superimposed ripple may be obtained in place of an elliptical pattern such as is shown in FIG. 10. The nearly circular pattern results in reduced 60 Hz, as well as reduced 30 Hz modulation.

Since undesirable distortion of horizontal patterns is encountered in other applications, as well as in doppler VOR antenna systems, the same method comprising the use of deliberately predistorting the primary pattern to correct for the counterpoise distortion may also be employed in these other applications, for example, the VOR antennas in place of four loops.

It will be clear to those versed in the art that directional antennas of types other than cylindrical antennas with slots may be used to achieve similar results, for example, antennas consisting of stacked rings can be used.

I claim:

1. A radiating antenna system, radiating horizontally polarized waves comprising means providing a conductive horizontal elevated sheet of limited dimensions,
   A. First radiating means centrally located with respect to said conductive sheet, said radiating means having a substantially omnidirectional radiation pattern and radiating a first frequency,
   B. First transmitter means for energizing said first radiating means,
   C. Second omnidirectional radiating means, comprising a plurality of directional antennas arranged on the conducting sheet around the first means, each oriented to radiate maximum radiation toward the first radiating means, said second means radiating a second frequency,
   D. Second transmitter means for sequentially energizing said second radiating means,
   E. Whereby the radiation center of said second radiating means effectively moves around said first omnidirectional radiation means.

2. A omnidirectional radiator as in claim 1 wherein the directional antenna radiates an eccentric oval like radiation pattern.

3. An omnidirectional radiator as in claim 2 wherein the conducting sheet is circular.

4. An omnidirectional radiator as in claim 3 wherein the shape of the oval like polar radiation pattern is similar to the polar plot of the inverse of the transmission losses in various directions from the antenna over the conductive sheet as measured at a constant distance from the antenna.

5. A radiating antenna system as in claim 1 wherein the conductive sheet is circular and the directional antennas are equally spaced around a circle concentric with the circular sheet.

6. A radiating antenna system as in claim 5 wherein the polar radiation patterns of the directional antennas are all alike and have eccentric oval like shapes.

* * * * *